United States Patent
Wang

(10) Patent No.: US 11,811,886 B2
(45) Date of Patent: Nov. 7, 2023

(54) METHODS AND APPARATUSES FOR PROXY DEPLOYMENT

(71) Applicant: Telefonaktiebolaget LM Ericsson (PUBL), Stockholm (SE)

(72) Inventor: Cheng Wang, Shanghai (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 17/428,149

(22) PCT Filed: Jan. 9, 2020

(86) PCT No.: PCT/CN2020/071214
§ 371 (c)(1),
(2) Date: Aug. 3, 2021

(87) PCT Pub. No.: WO2020/164343
PCT Pub. Date: Aug. 20, 2020

(65) Prior Publication Data
US 2022/0060548 A1    Feb. 24, 2022

(30) Foreign Application Priority Data

Feb. 15, 2019  (WO) ................ PCT/CN2019/075257

(51) Int. Cl.
*H04L 67/51* (2022.01)
*H04L 67/561* (2022.01)

(52) U.S. Cl.
CPC ............ *H04L 67/51* (2022.05); *H04L 67/561* (2022.05)

(58) Field of Classification Search
CPC .............................. H04L 67/51; H04L 67/561
(Continued)

(56) References Cited

U.S. PATENT DOCUMENTS 8,200,777 B2 * 6/2012 Weber ................ H04L 12/2805
709/201
2008/0114628 A1 * 5/2008 Johnson ............ G06Q 10/06311
707/999.104

(Continued)

FOREIGN PATENT DOCUMENTS

CN    109274512 A    1/2019
WO   2019 025855 A1    2/2019

OTHER PUBLICATIONS

3GPP TR 23.742 v1.2.0; Technical Report; 3rd Generation Partnership Project; Technical Specification Group Services and System Aspects; Study on Enhancements to the Service-Based Architecture (Release 16)—Nov. 2018.

(Continued)

*Primary Examiner* — Wing F Chan
*Assistant Examiner* — Leon Y Tseng
(74) *Attorney, Agent, or Firm* — Christopher & Weisberg, P.A.

(57) ABSTRACT

Methods and apparatuses for proxy deployment are disclosed. According to an embodiment, a first network function receives, from a second network function, a request for proxy discovery. The first network function determines at least one proxy for the second network function based on the request for proxy discovery and one or more proxy profiles available at the first network function. The first network function sends first information about the at least one proxy to the second network function.

16 Claims, 8 Drawing Sheets

(58) Field of Classification Search
USPC .......................................................... 709/223
See application file for complete search history.

(56) References Cited

U.S. PATENT DOCUMENTS

2017/0111476 A1* 4/2017 Saheba ................ H04L 65/102
2018/0115462 A1   4/2018 Makovsky
2018/0294983 A1* 10/2018 Mani ................... H04L 61/4511

OTHER PUBLICATIONS

3GPP TSG-SA WG2 Meeting #130; Kochi, India; Change Request; Title: eSBA communication schemas related to general discovery and selection; Source to WG: Ericsson, Oracle, Sprint; Source to TSG: SA2 (S2-1900275)—Jan. 21-25, 2019.

3GPP TSG-SA2 Meeting #130; Kochi, India; Change Request; Title: Introduction of indirect communication between NF services, and implicit discovery (S2-1901105)—Jan. 21-25, 2019.

PCT International Search Report issued for International application No. PCT/CN2020/071214—dated Apr. 21, 2020.

EPO Communication with Supplementary European Search Report dated Sep. 20, 2022 for Patent Application No. 20755388.4, consisting of 13-pages.

3GPP TSG CT WG4 Meeting #86 C4-186073; Title: Hierarchical NF discovery in iteration mode; Source to WG: China Mobile; Source to TSG: CT4; Work Item Code: 5GS_Ph1-CT; Date and Location: Aug. 20-24, 2018, West Palm Beach, US, consisting of 10-pages.

3GPP TS 29.500 V15.2.1; 3rd Generation Partnership Project; Technical Specification Group Core Network and Terminals; 5G System; Technical Realization of Service Based Architecture; Stage 3 (Release 15); Dec. 2018, consisting of 32-pages.

Chinese Office Action with English machine translation dated May 26, 2023 for Patent Application No. 202080014393.5, consisting of 22-pages.

* cited by examiner

METHODS AND APPARATUSES FOR PROXY DEPLOYMENT

PRIORITY

This nonprovisional application is a U.S. National Stage Filing under 35 U.S.C. § 371 of International Patent Application Serial No. PCT/CN2020/071214 filed Jan. 9, 2020 and entitled "METHODS AND APPARATUSES FOR PROXY DEPLOYMENT" which claims priority to International Patent Application Serial No. PCT/CN2019/075257 filed Feb. 15, 2019 both of which are hereby incorporated by reference in their entirety.

TECHNICAL FIELD

Embodiments of the disclosure generally relate to communication, and, more particularly, to methods and apparatuses for proxy deployment.

BACKGROUND

This section introduces aspects that may facilitate better understanding of the present disclosure. Accordingly, the statements of this section are to be read in this light and are not to be understood as admissions about what is in the prior art or what is not in the prior art.

The ongoing 3rd generation partnership project (3GPP) activity aims to reform the core network architecture for next generation network. Such activity includes introduction of service based architecture (SBA) for better cloud adoption. FIG. 1 is a high level architectural diagram depicting the current 3GPP 5th generation (5G) network SBA. As shown, the architecture comprises a next generation (NG) user equipment (UE), a radio access network (RAN), a user plane function (UPF), a data network (e.g. operator or Internet), an access and mobility management function (AMF), a session management function (SMF), an authentication server function (AUSF), a unified data management (UDM), a policy control function (PCF), a network function (NF) repository function (NRF), a network exposure function (NEF) and an application function (AF).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for proxy deployment.

According to a first aspect of the disclosure, there is provided a method implemented at a first network function. The method may comprise receiving, from a second network function, a request for proxy discovery. The method may further comprise determining at least one proxy for the second network function based on the request for proxy discovery and one or more proxy profiles available at the first network function. The method may further comprise sending first information about the at least one proxy to the second network function.

In this way, the requesting network function can automatically obtain the proxy information thereby saving manual configuration effort.

In an embodiment of the disclosure, each proxy profile of the one or more proxy profiles may be from at least one of: local configuration of the first network function; registration from a proxy corresponding to the proxy profile; registration from a third network function associated with the proxy corresponding to the proxy profile; and registration from a third party node.

In an embodiment of the disclosure, the association between the proxy and the third network function may be indicated from one of: the local configuration; the proxy; the third network function; and the third party node.

In an embodiment of the disclosure, the method may further comprise, in response to a change of proxy profile of the at least one proxy, informing the second network function about the change of proxy profile.

In an embodiment of the disclosure, the request for proxy discovery may comprise second information for proxy selection. A proxy whose proxy profile is matched with the second information may be determined as one of the at least one proxy.

In an embodiment of the disclosure, the request for proxy discovery may be a request for network function discovery which is reused to additionally request for proxy discovery. The method may further comprise determining at least one third network function for the second network function. Third information about the at least one third network function and the first information may be sent together to the second network function.

In an embodiment of the disclosure, the request for network function discovery may comprise fourth information for network function selection. The second information may be the same as or different than the fourth information.

In an embodiment of the disclosure, the request for proxy discovery may be a request for network function discovery which is reused to individually request for proxy discovery.

In an embodiment of the disclosure, the proxy profile of a proxy may comprise at least one of: identification information, capability information, subscriber information, location information, and network information related to the proxy.

According to a second aspect of the disclosure, there is provided a method implemented at a second network function. The method may comprise sending, to a first network function, a request for proxy discovery. The method may further comprise receiving, from the first network function, first information about at least one proxy. The method may further comprise determining a proxy for routing traffic, based on the first information.

In this way, the requesting network function can automatically obtain the proxy information thereby saving manual configuration effort.

In an embodiment of the disclosure, the method may further comprise receiving, from the first network function, information about a change of proxy profile of the at least one proxy.

In an embodiment of the disclosure, the request for proxy discovery may comprise second information for proxy selection.

In an embodiment of the disclosure, the request for proxy discovery may be a request for network function discovery which is reused to additionally request for proxy discovery. Third information about at least one third network function and the first information may be received together from the first network function.

In an embodiment of the disclosure, the request for network function discovery may comprise fourth information for network function selection. The second information may be the same as or different than the fourth information.

In an embodiment of the disclosure, the method may further comprise determining a third network function for providing a service to the second network function, based on the third information. The method may further comprise invoking the service towards the determined third network function via the determined proxy.

In an embodiment of the disclosure, the request for proxy discovery may be a request for network function discovery which is reused to individually request for proxy discovery.

According to a third aspect of the disclosure, there is provided a method implemented at a proxy. The method may comprise obtaining a proxy profile of the proxy. The method may further comprise registering the proxy profile to a first network function.

In this way, a flexible deployment can be enabled.

In an embodiment of the disclosure, the proxy profile of the proxy may comprise at least one of: identification information, capability information, subscriber information, location information, and network information related to the proxy.

In an embodiment of the disclosure, the proxy profile of the proxy may indicate an association between the proxy and a second network function.

In an embodiment of the disclosure, the association may be obtained from at least one of: local configuration of the proxy; the second network function; and a third party node.

According to a fourth aspect of the disclosure, there is provided a method implemented at a network node. The method may comprise obtaining a proxy profile of a proxy associated with the network node. The method may further comprise registering the proxy profile to a first network function.

In this way, the deployment of the proxy can be facilitated.

In an embodiment of the disclosure, the proxy profile of the proxy may comprise at least one of: identification information, capability information, subscriber information, location information, and network information related to the proxy.

In an embodiment of the disclosure, the proxy profile of the proxy may indicate the association between the proxy and the network node.

In an embodiment of the disclosure, the network node may be a second network function. The method may further comprise obtaining a network function profile of the second network function. The network function profile and the proxy profile may be registered together to the first network function.

In an embodiment of the disclosure, the association may be obtained from at least one of: local configuration of the second network function; the proxy; and a third party node.

In an embodiment of the disclosure, the network node may be a third party node.

In an embodiment of the disclosure, the association may be obtained from at least one of: local configuration of the third party node; the proxy; and a second network function.

In an embodiment of the disclosure, the third party node may be an operation administration and maintenance (OAM) node.

According to a fifth aspect of the disclosure, there is provided a first network function. The first network function may comprise at least one processor and at least one memory. The at least one memory may contain instructions executable by the at least one processor, whereby the first network function may be operative to receive, from a second network function, a request for proxy discovery. The first network function may be further operative to determine at least one proxy for the second network function based on the request for proxy discovery and one or more proxy profiles available at the first network function. The first network function may be further operative to send first information about the at least one proxy to the second network function.

In an embodiment of the disclosure, the first network function may be operative to perform the method according to the above first aspect.

According to a sixth aspect of the disclosure, there is provided a second network function. The second network function may comprise at least one processor and at least one memory. The at least one memory may contain instructions executable by the at least one processor, whereby the second network function may be operative to send, to a first network function, a request for proxy discovery. The second network function may be further operative to receive, from the first network function, first information about at least one proxy. The second network function may be further operative to determine a proxy for routing traffic, based on the first information.

In an embodiment of the disclosure, the second network function may be operative to perform the method according to the above second aspect.

According to a seventh aspect of the disclosure, there is provided a proxy. The proxy may comprise at least one processor and at least one memory. The at least one memory may contain instructions executable by the at least one processor, whereby the proxy may be operative to obtain a proxy profile of the proxy. The proxy may be further operative to register the proxy profile to a first network function.

In an embodiment of the disclosure, the proxy may be operative to perform the method according to the above third aspect.

According to an eighth aspect of the disclosure, there is provided a network node. The network node may comprise at least one processor and at least one memory. The at least one memory may contain instructions executable by the at least one processor, whereby the network node may be operative to obtain a proxy profile of a proxy associated with the network node. The network node may be further operative to register the proxy profile to a first network function.

In an embodiment of the disclosure, the network node may be operative to perform the method according to the above fourth aspect.

According to a ninth aspect of the disclosure, there is provided a computer program product. The computer program product may comprise instructions which when executed by at least one processor, cause the at least one processor to perform the method according to any of the above first to fourth aspects.

According to a tenth aspect of the disclosure, there is provided a computer readable storage medium. The computer readable storage medium may comprise instructions which when executed by at least one processor, cause the at least one processor to perform the method according to any of the above first to fourth aspects.

According to an eleventh aspect of the disclosure, there is provided a first network function. The first network function may comprise a reception module for receiving, from a second network function, a request for proxy discovery. The first network function may further comprise a determination module for determining at least one proxy for the second network function based on the request for proxy discovery and one or more proxy profiles available at the first network function. The first network function may further comprise a sending module for sending first information about the at least one proxy to the second network function.

According to a twelfth aspect of the disclosure, there is provided a second network function. The second network function may comprise a sending module for sending, to a first network function, a request for proxy discovery. The second network function may further comprise a reception module for receiving, from the first network function, first information about at least one proxy. The second network function may further comprise a determination module for determining a proxy for routing traffic, based on the first information.

According to a thirteenth aspect of the disclosure, there is provided a proxy. The proxy may comprise an obtaining module for obtaining a proxy profile of the proxy. The proxy may further comprise a registration module for registering the proxy profile to a first network function.

According to a fourteenth aspect of the disclosure, there is provided a network node. The network node may comprise an obtaining module for obtaining a proxy profile of a proxy associated with the network node. The network node may further comprise a registration module for registering the proxy profile to a first network function.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
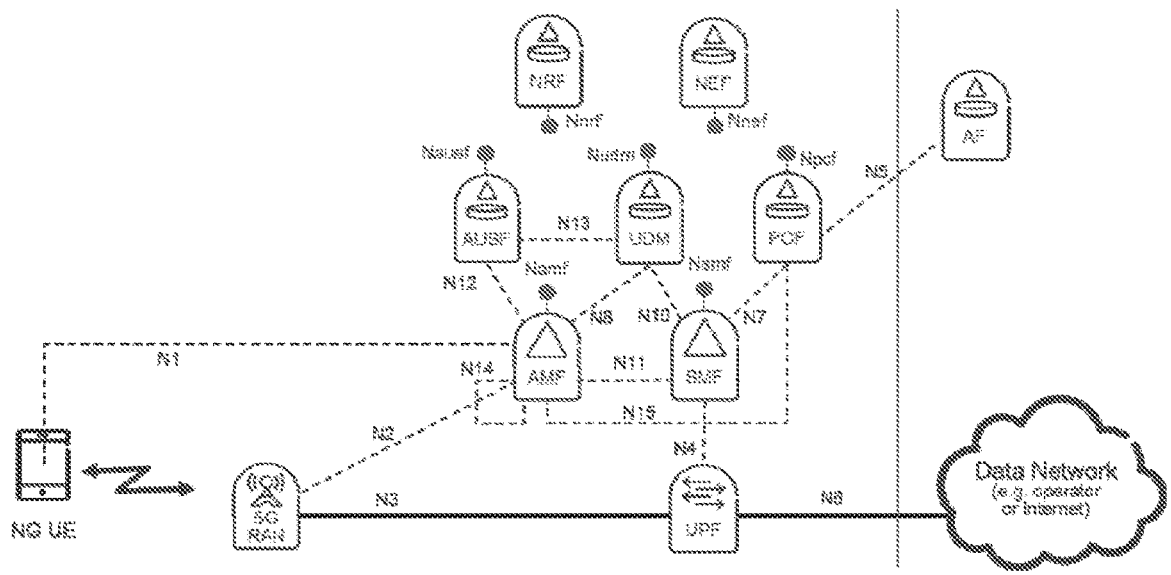
FIG. 1 is a diagram illustrating the current 5G network SBA.

For the purpose of explanation, details are set forth in the following description in order to provide a thorough understanding of the embodiments disclosed. It is apparent, however, to those skilled in the art that the embodiments may be implemented without these specific details or with an equivalent arrangement.

The functionality of NRF is somehow mimic from information technology (IT) industry of "service register", e.g. to negotiate how and locate where a service can be utilized by its consumer e.g. another NF/service instance. Per 3GPP definition, NRF supports service discovery function. That is, the NF service discovery may be implemented by NRF through receiving NF Discovery Request from an NF instance and providing the information of the discovered NF instances (be discovered) to the NF instance. The NF selection may comprise selecting one NF instance among the NF instance(s) discovered during the NF service discovery. The NF selection may be implemented by the requester NF, e.g. the SMF selection is supported by the AMF.

Per 3GPP definition, NRF also maintains the NF profile of available NF instances and their supported services. For NRF to properly maintain the information of available NF instances and their supported services, each NF instance informs NRF of the list of NF services that it supports and other NF instance information, which is called NF profile.

For example, as per 3GPP TS 23.501 V15.0.0, the typical information of NF profile of NF instance that is registered and maintained in NRF may include, but not limited to:

NF instance identifier (ID);
NF type;
public land mobile network (PLMN) ID;
network slice related ID(s) e.g. single network slice selection assistance information (S-NSSAI), network slice instance (NSI) ID;
fully qualified domain name (FQDN) or Internet protocol (IP) address of NF;
NF capacity information;
NF specific service authorization information;
names of supported services;
endpoint information of instance(s) of each supported service;
identification of stored data/information;
other service parameter e.g. data network name (DNN), notification endpoint for each type of notification that the NF service is interested in receiving. It can be then seen that NF profiles hold both static and dynamic information for per NF, and a plurality of NFs and their NF profiles are stored in NRF.

For example, as per 3GPP TS 23.502 V15.0.0, the following table shows the services provided by NRF.

TABLE 1

Services provided by NRF

| Service Name | Service Operations | Operation Semantics | Example Consumer(s) |
| --- | --- | --- | --- |
| Nnrf_NFManagement | NFRegister | Request/Response | AMF, SMF, UDM, AUSF, NEF, PCF, SMSF, NSSF |
| | NFUpdate | Request/Response | AMF, SMF, UDM, AUSF, NEF, PCF, SMSF, NSSF |
| | NFDeregister | Request/Response | AMF, SMF, UDM, AUSF, NEF, PCF, SMSF, NSSF |
| | NFStatusSubscribe | Subscribe/Notify | AMF, SMF, PCF, NEF, NSSF, SMSF, AUSF |
| | NFStatusNotify | | AMF, SMF, PCF, NEF, NSSF, SMSF, AUSF |
| | NFStatusUnSubscribe | | AMF, SMF, PCF, NEF, NSSF, SMSF, AUSF |
| Nnrf_NFDiscovery | Request | Request/Response | AMF, SMF, PCF, NEF, NSSF, SMSF, AUSF |

In the above table, the Nnrf_NFManagement service enables NF service provider to register its NF profile e.g. supported NF services and other NF instance information in NRF and make it available to be discovered by other NF(s). The Nnrf_NFDiscover service enables NF service consumer to discover the service provided by NF service provider by querying NRF. Depending on the requesting NF and the target NF, different input parameters may be included in the discovery request to enable NRF to match a target NF best serving the requesting NF. From protocol level, 3GPP defines HTTP/2 method to support NF service consumer to get NF service provider's IP address(es) or FQDN matching certain searching criteria.

In short, unless local configuration of next hop NF information is available in a certain NF, the NF shall make use of NRF to find out the information like location and capability of next hop NF and related services it intends to use, and then proceed with traffic handling.

As per request for comments (RFC) 7230, hypertext transfer protocol (HTTP) enables the use of proxy to satisfy requests through a chain of connections. They are commonly used in HTTP connections for various reasons like naming abstraction, anonymity, address translation and hiding, load balance, monitoring and content control, cache and performance improving, security enhancement, etc.

In HTTP based 3GPP SBA network, the currently defined HTTP proxy role is security edge protection proxy (SEPP) for inter-PLMN roaming. As per 3GPP TS 23.501 V15.0.0, the SEPP is a non-transparent proxy and supports the following functionality: message filtering and policing on inter-PLMN control plane interfaces; and topology hiding.

Figure 2:
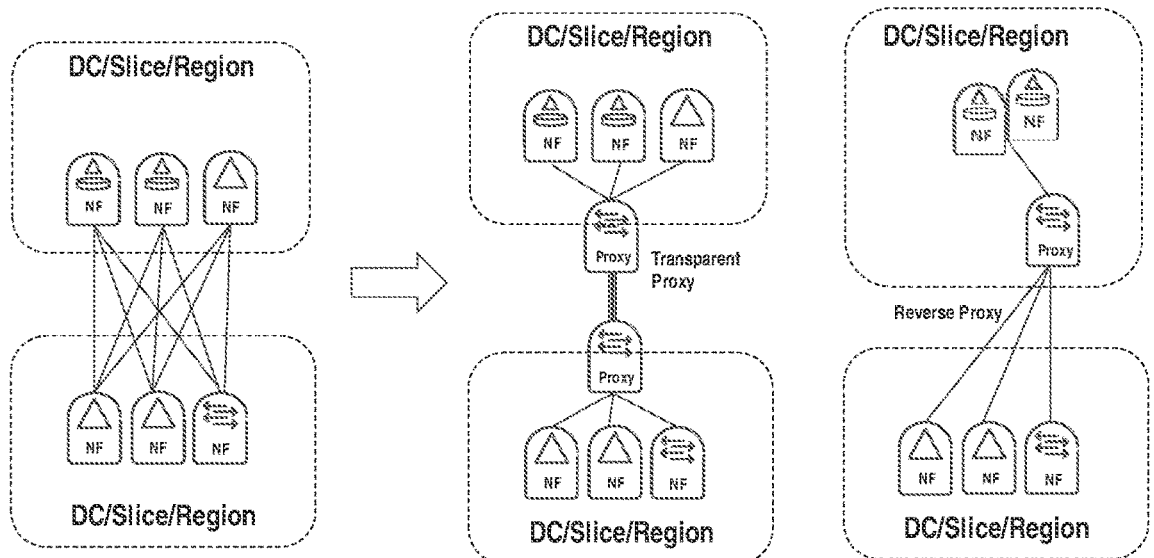
FIG. 2 is a diagram illustrating an example of proxy deployment.

The 3GPP defined 5G core (5GC) architecture uses widely HTTP signaling for NF/NF communication. It may be expected that a huge number of HTTP signaling connections will be set up between different NF pairs depending on the traffic scenario within the network. It brings a big challenge for the network operator to manage such signaling, such as challenge on connection management, signaling aggregation, traffic control, domain isolation, security, etc. It may then be anticipated that usage of HTTP proxy would quite attract network operators in their network implementation. As shown in FIG. 2, depending on the scenario or deployment, there could be transparent proxies to help aggregate and relay HTTP messages among different realms/domains/regions, or reverse proxies to help load balancing, simplify routing and hide NF server topology. The term "DC" in FIG. 2 refers to data center.

However, there has been no solution on how to deploy HTTP proxy in 5GC so far, e.g. how a NF consumer would know which proxy to be used, or how a NF provider would delegate its presence in the network to a proxy. On the other hand, features introduced in telco network can demand additional deployment requirement on HTTP proxy. For example, in case of network slicing, it could require a dedicated HTTP proxy per slice to avoid HTTP traffic interference among slices. As another example, routing to NF service providers from different regions or PLMNs can be anchored in different proxies to separate the traffic. It is then required HTTP proxy can be selected per region area, etc. Considering the above aspects, it would be desirable to provide an effective and flexible way for mobile network operator (MNO) to deploy HTTP proxy in its 5GC network.

The present disclosure proposes a solution for proxy deployment. As an exemplary example, the solution may be applicable to the communication system shown in FIG. 1. Note that the principle of the present disclosure may also be applicable to any other suitable communication system either currently known or to be developed in the future. Hereinafter, the solution will be described in detail with reference to FIGS. 3-16.

Figure 3:
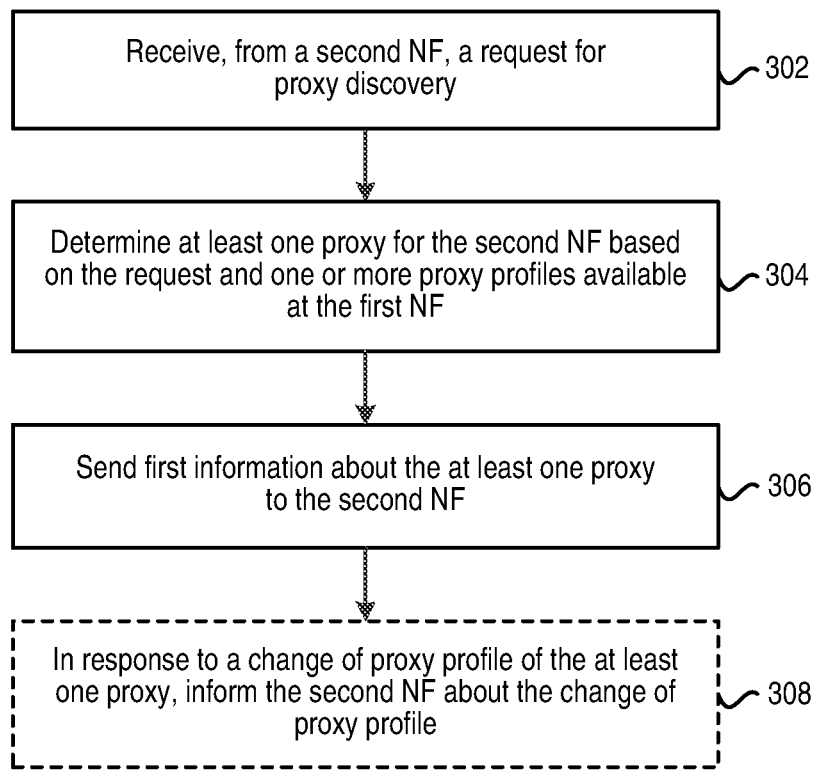
FIG. 3 is a flowchart illustrating a method implemented at a first network function according to an embodiment of the disclosure.

FIG. 3 is a flowchart illustrating a method implemented at a first network function according to an embodiment of the disclosure. For example, the first network function may be an NRF or any other entity having similar functionality. At block 302, the first network function receives, from a second network function, a request for proxy discovery. For example, the second network function may be a service consumer such as that listed in the above Table 1. The request for proxy discovery may include second information for proxy selection. Examples of the second information may include, but not limited to, identification information, capability information, subscriber information, location information, and network information related to a proxy, which will be described later.

As a first option, the request for proxy discovery may be a request for network function discovery which is reused (or redefined) to individually request for proxy discovery. As a second option, the request for proxy discovery may be a request for network function discovery which is reused (or redefined) to additionally request for proxy discovery. That is, both proxy discovery and network function discovery are requested by the redefined request. Various ways (e.g. adding an indicator) may be used to indicate whether only proxy discovery or a combination of proxy discovery and network function discovery is requested.

At block 304, the first network function determines at least one proxy for the second network function based on the request for proxy discovery and one or more proxy profiles available at the first network function. For example, a proxy whose proxy profile is matched with the second information may be determined as one of the at least one proxy. The proxy profile of a proxy may refer to information related to the proxy. Examples of such information may include, but not limited to, identification information, capability information, subscriber information, location information, and network information related to the proxy. Examples of the identification information related to the proxy may include, but not limited to:

identifier (ID) of proxy;
proxy type, e.g. transparent proxy, reverse proxy;
address information of proxy, e.g. FQDN or IP address;
a designated flag assigned by operator; and
universally unique identifier (UUID) in cloud deployment.

The capability information related to the proxy may depict the capability of the proxy, such as routing information, network capability information, protocol or interface information, or the like. Examples of the capability information may include, but not limited to:

capacity information;
load information;
service authorization information;
access point name (APN)/data network name (DNN) information;
interface or protocol variant, e.g. low layer link information, transportation protocol, IPv4/IPv6;
radio access technology (RAT) capability, e.g. long term evolution (LTE), new radio (NR);
sub-network type, e.g. evolved packet core (EPC), 5GC;
supported NF type, e.g. AMF, SMF, PCF, UDM;
supported NF services, e.g. Nnrf_NFManagement;
quality of service (QoS) information, e.g. high bitrate, low bitrate; and protocol level filtering information, e.g. HTTP header/body filter.

Examples of the subscriber information related to the proxy may include, but not limited to: SUPI/IMSI or its range; and GPSI/MSISDN or its range. The term SUPI refers to subscriber permanent identifier. The term IMSI refers to international mobile subscriber identification number. The term GPSI refers to generic public subscription identifier. The term MSISDN refers to mobile subscriber ISDN number and the term ISDN refers to integrated services digital network. The location information related to the proxy may refer to geography location information. Examples of the network information related to the proxy may include, but not limited to: PLMN ID; network slice related ID(s), e.g. S-NSSAI, NSI ID; network identity information, e.g. the specific network ID assigned by operator; data center information; and network topology information, e.g. sub-network information, regional code, cluster-ID, domain information, host and chassis information, IP address subnet.

For example, each proxy profile of the one or more proxy profiles may be obtained from one of: local configuration of the first network function (e.g. the proxy profile may be preconfigured at the first network function); registration from a proxy corresponding to (e.g. having at least part of) the proxy profile; registration from third network function associated with the proxy corresponding to the proxy profile; and registration from a third party node. The third party node belongs to a type different than the proxy and the third network function, and may be, for example, an operation administration and maintenance (OAM) node. Alternatively, each proxy profile may be obtained from any combination of the above listed ways. Optionally, the association (or binding) between the proxy and the third network function may be indicated from one of: the local configuration; the proxy; the third network function; and the third party node.

At block 306, the first network function sends first information about the at least one proxy to the second network function. For example, the first information may be at least part of the proxy profile of the determined at least one proxy. According to the method including blocks 302-306, the requesting network function can automatically obtain the proxy information thereby saving manual configuration effort. In a case that the first network function is an NRF, a 5GC NF can be enabled to automatically obtain proxy information on top of service discovery procedure. Optionally, at block 308, in response to a change of proxy profile of the at least one proxy, the first network function may inform the second network function about the change of proxy profile. In a case that the first network function is an NRF, block 308 may be implemented via Nnrf_NFManagement service subscription/notification method.

Figure 4:
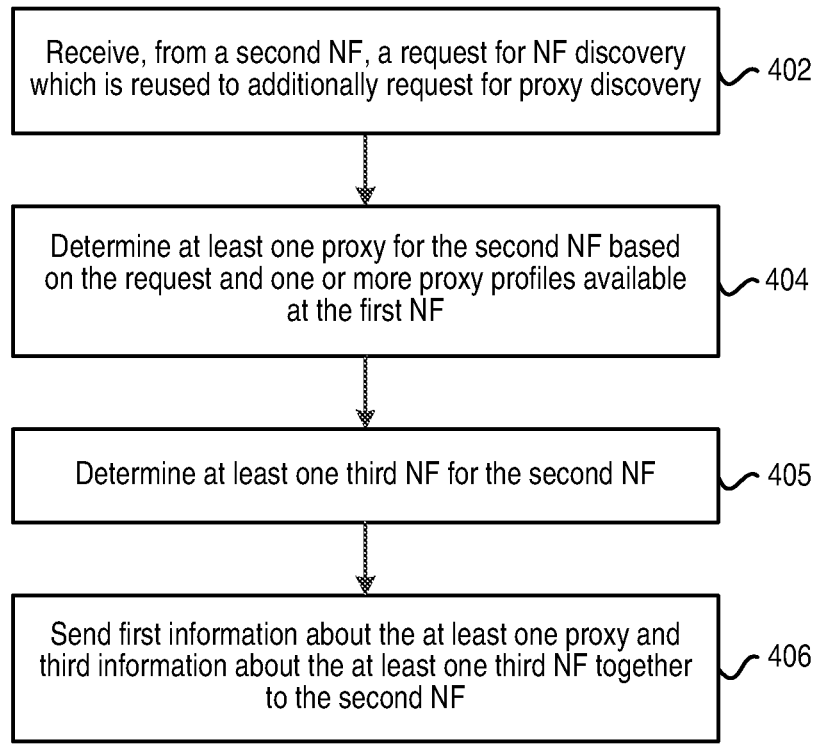
FIG. 4 is a flowchart illustrating a method implemented at a first network function according to another embodiment of the disclosure.

FIG. 4 is a flowchart illustrating a method implemented at a first network function according to another embodiment of the disclosure. This method corresponds to the above second option where both proxy discovery and network function discovery are requested by the redefined request. At block 402, the first network function receives, from a second network function, a request for network function discovery which is reused (or redefined) to additionally request for proxy discovery. Block 404 may the same as block 304 and its details are omitted here.

At block 405, the first network function determines at least one third network function for the second network function. For example, the redefined request may include fourth information for network function selection. A third network function whose network function profile is matched with the fourth information may be determined as one of the at least one third network function. Optionally, the fourth information may be the same as or different than the above second information for proxy selection. At block 406, third information about the at least one third network function and the first information about the at least one proxy are sent together to the second network function. For example, the third information may be at least part of the network function profile of the determined at least one third network function.

Figure 5:
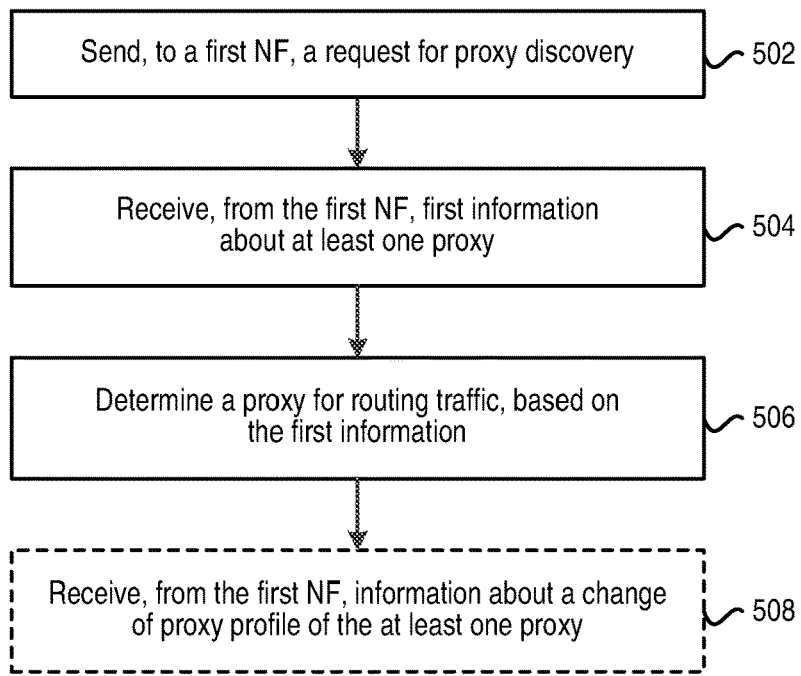
FIG. 5 is a flowchart illustrating a method implemented at a second network function according to an embodiment of the disclosure.

FIG. 5 is a flowchart illustrating a method implemented at a second network function according to an embodiment of the disclosure. For example, the second network function may be a service consumer such as that listed in the above Table 1. At block 502, the second network function sends, to a first network function, a request for proxy discovery. For example, the first network function may be an NRF or any other entity having similar functionality. The request for proxy discovery may include second information for proxy selection. As a first option, the request for proxy discovery may be a request for network function discovery which is reused (or redefined) to individually request for proxy discovery. As a second option, the request for proxy discovery may be a request for network function discovery which is reused (or redefined) to additionally request for proxy discovery. Block 502 corresponds to block 302 and its details are omitted here.

At block 504, the second network function receives, from the first network function, first information about at least one proxy. Block 504 corresponds to block 306 and its details are omitted here. At block 506, the second network function determines a proxy for routing traffic, based on the first information. That is, one of the at least one proxy is determined to be used for routing traffic. Note that the present disclosure is not particularly limited in this determination. Optionally, at block 508, the second network function receives, from the first network function, information about a change of proxy profile of the at least one proxy. Block 508 corresponds to block 308 and its details are omitted here.

Figure 6:
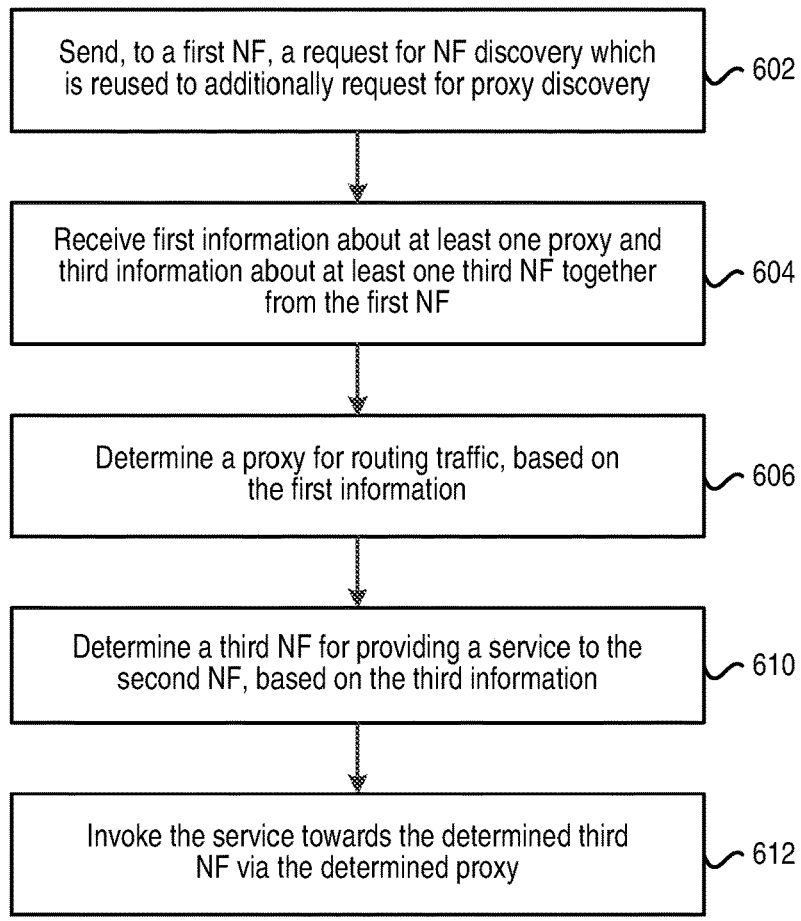
FIG. 6 is a flowchart illustrating a method implemented at a second network function according to another embodiment of the disclosure.

FIG. 6 is a flowchart illustrating a method implemented at a second network function according to another embodiment of the disclosure. This method corresponds to the above second option where both proxy discovery and network function discovery are requested by the redefined request. At block 602, the second network function sends, to a first network function, a request for network function discovery which is reused (or redefined) to additionally request for proxy discovery. At block 604, third information about at least one third network function and first information about at least one proxy are received together from the first network function. Block 606 may be the same as block 506 and its details are omitted here.

At block 610, the second network function determines a third network function for providing a service to the second network function, based on the third information. Similar to block 506, the present disclosure is not particularly limited in this determination. At block 612, the second network function invokes the service towards the determined third network function via the determined proxy.

Figure 7:
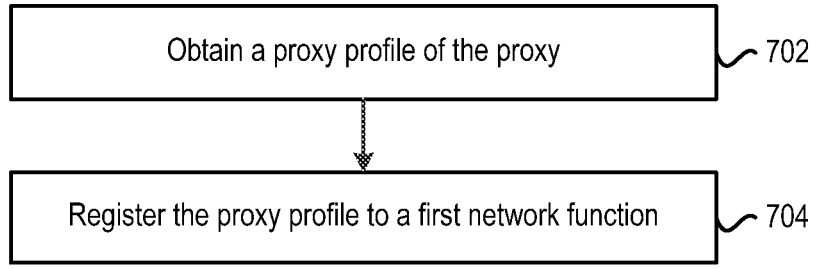
FIG. 7 is a flowchart illustrating a method implemented at a proxy according to an embodiment of the disclosure.

FIG. 7 is a flowchart illustrating a method implemented at a proxy according to an embodiment of the disclosure. At block 702, the proxy obtains a proxy profile of the proxy. For example, the proxy profile may be obtained from at least one of: local configuration of the proxy, a second network function, and a third party node (e.g. an OAM node). The term second network function used here is mentioned relative to a first network function which may be an NRF or any other entity having similar functionality. Depending on the specific scenario, the second network function may be a service consumer or a service provider. Optionally, the proxy profile of the proxy may indicate an association between the proxy and the second network function. Other details of the proxy profile have been described above and thus are omitted here. At block 704, the proxy registers the proxy profile to the first network function. In a case that the first network function is an NRF, the registration may be implemented on top of service registration procedure. Since the proxy profile can be registered by the proxy itself, a flexible deployment and an optimization of resource allocation can be enabled in telco environment, taking account of various use cases (e.g. for network slice, PLMN interworking, domain/region interworking).

Figure 8:
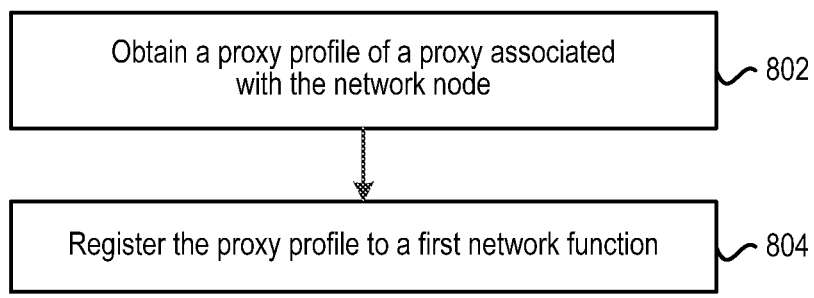
FIG. 8 is a flowchart illustrating a method implemented at a network node according to an embodiment of the disclosure.

FIG. 8 is a flowchart illustrating a method implemented at a network node according to an embodiment of the disclosure. At block 802, the network node obtains a proxy profile of a proxy associated with the network node. As a first option, the network node may be a third party node, e.g. an OAM node. In this option, the proxy profile may be obtained from at least one of: local configuration of the third party node, the proxy, and a second network function. The term second network function used here is mentioned relative to a first network function which may be an NRF or any other entity having similar functionality. Depending on the specific scenario, the second network function may be a service consumer or a service provider. As a second option, the network node may be a second network function, which will be described later. Optionally, the proxy profile of the proxy may indicate the association between the proxy and the network node. At block 804, the network node registers the proxy profile to the first network function.

Figure 9:
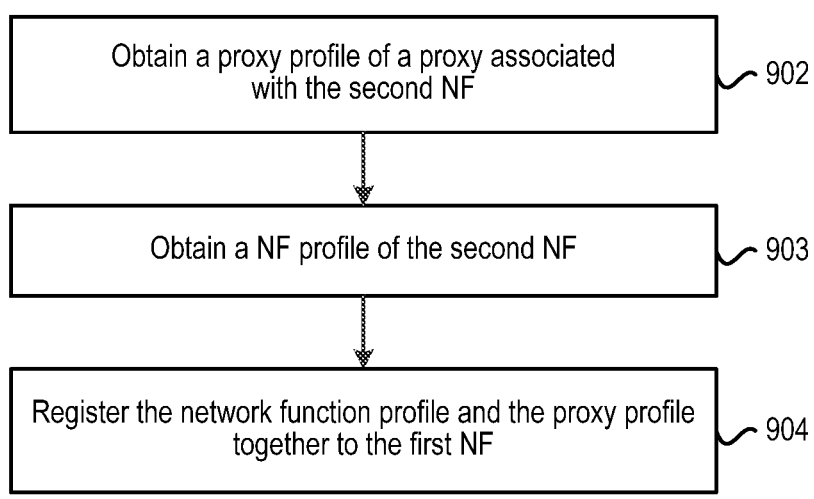
FIG. 9 is a flowchart illustrating a method implemented at a network node according to another embodiment of the disclosure.

FIG. 9 is a flowchart illustrating a method implemented at a network node according to another embodiment of the disclosure. This method corresponds to the above second option where the network node is a second network function. At block 902, the second network function obtains a proxy profile of a proxy associated with the second network function. For example, the proxy profile may be obtained from at least one of: local configuration of the second network function, the proxy, and a third party node (e.g. an OAM node). At block 903, the second network function obtains a network function profile of the second network function. At block 904, the network function profile and the proxy profile are registered together to the first network function.

Figure 10:
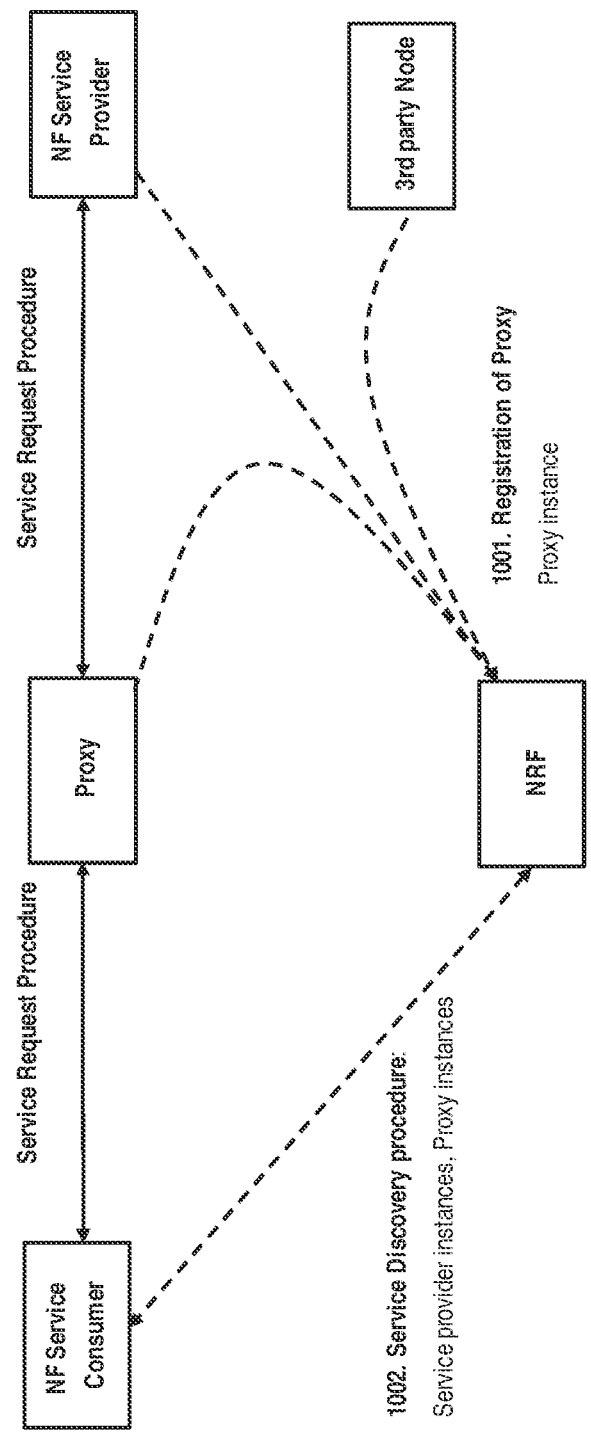
FIG. 10 is a diagram illustrating an exemplary process according to an embodiment of the disclosure.

FIG. 10 is a diagram illustrating an exemplary process according to an embodiment of the disclosure. As shown, this exemplary process involves five nodes or entities which are a proxy, an NF service provider, a third party node (e.g. an OAM node), an NRF, and an NF service consumer. At block 1001, the proxy profile (e.g. the proxy instance(s) and capability it supports) is registered in the NRF. The proxy profile may be registered in the NRF, either piggyback in registration procedure of the service provider, or self-registered by the proxy or registered by the third party node. At block 1002, based on the existing NF service discovery procedure, the NF consumer gets the proxy information for its traffic, either explicitly (e.g. proxy instances being discovered together with the NF service provider) or implicitly (e.g. proxy instance presenting as an NF service provider). Then, the NF service consumer invokes the service towards the NF service provider via the proxy.

Figure 11:
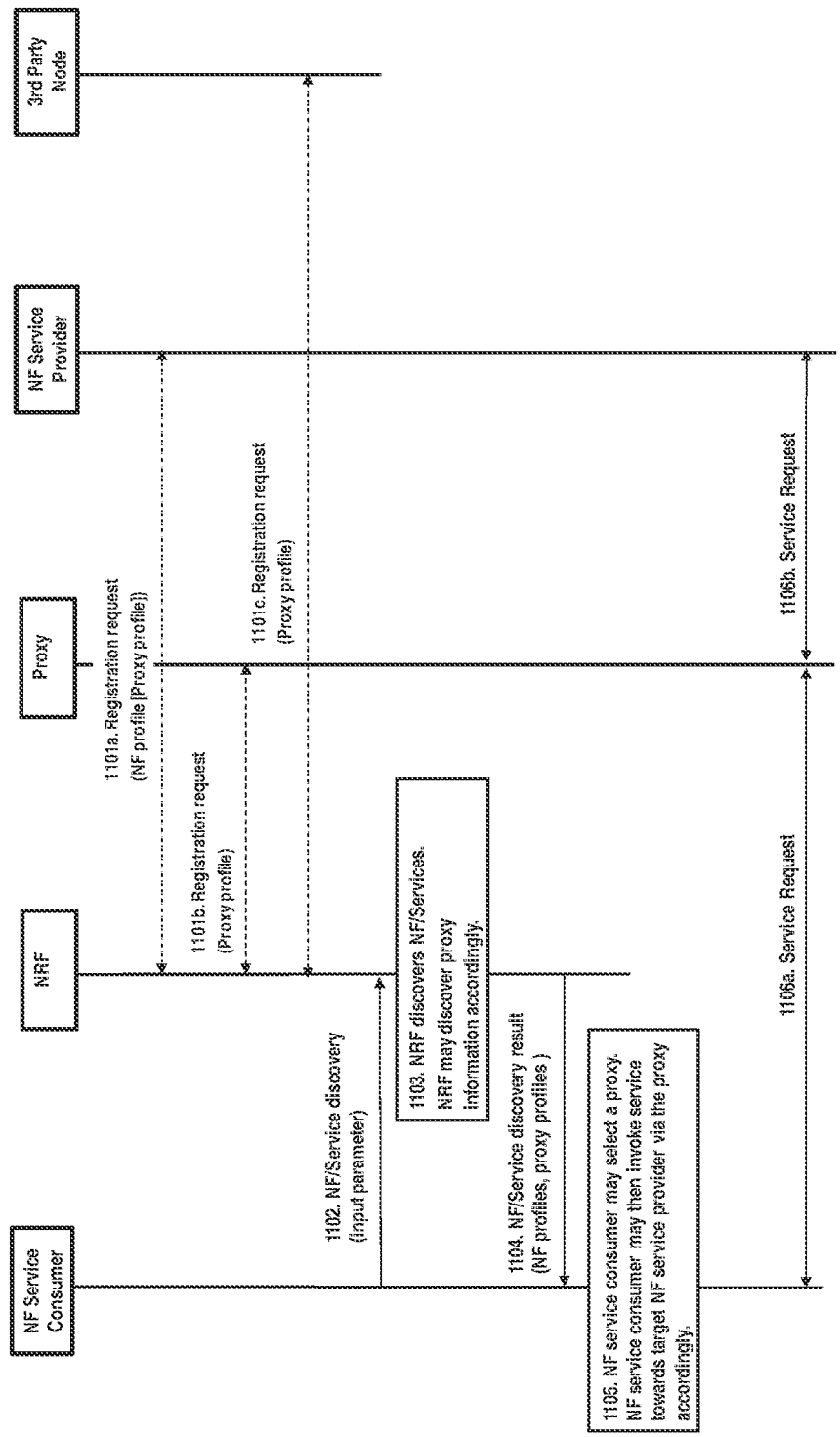
FIG. 11 is a flowchart illustrating the exemplary process of FIG. 10.

FIG. 11 is a flowchart illustrating the exemplary process of FIG. 10 in more details. FIG. 11 shows an example that the NF service consumer makes use of an input parameter (e.g. Network Slice information/NSSAI) for service discovery. The NRF performs the service provider discovery based on this input, meanwhile using the same input for proxy discovery. However, it is also feasible that discovery of service provider and proxy are based on different input parameters, e.g. one set of input for NF profile and another set of input for proxy profile.

Suppose the NF service provider has a specific setting on proxy for services to be invoked by the service consumer. Then, at block 1101*a*, the specific proxy profile is registered in the NRF as part of the NF profile for the corresponding NF service provider. In this way, the registering of the proxy profile is piggyback within the service registration procedure of the NF service provider.

Alternatively, at block 1101*b*, the proxy performs a standalone profile registration in the NRF. That is, the proxy profile is registered in the NRF by the proxy itself. Optionally, the proxy may indicate its binding with the NF service provider, e.g. based on attributes from proxy profile or from NF profile of the NF service provider. The NRF may then store the proxy and its profile as part of the NF profile for the corresponding NF service provider.

Alternatively, at block 1101*c*, the third party node performs a proxy profile registration in the NRF. The specific proxy profile may be registered in the NRF standalone. Optionally, the third party node may indicate binding between the proxy and the NF service provider instance, e.g. based on attributes from proxy profile or from NF profile of the NF service provider. The NRF may then store the proxy and its profile as part of NF profile for the corresponding NF service provider. Note that the number of each node shown in FIG. 11 may be more than one.

At block 1102, upon incoming traffic, the NF service consumer triggers NF discovery procedure (e.g. as per 3GPP TS 23.501) to discover a NF service provider. Optionally, the NF service consumer may provide additional input parameter that can be used for proxy selection, e.g. some attributes matching proxy profile. In this example, the input parameter is NSSAI. Optionally, the NF service consumer may trigger a standalone discovery procedure to discover proxy explicitly, with input that can be used for proxy selection, e.g. some attributes matching proxy profile. In this example, the input parameter is NSSAI.

At block 1103, the NRF discovers NF service provider instances serving the input parameter(s). Additionally, NRF may discover proxy instances based on the input parameter(s). The NRF may perform such discovery based on the input from the NF service consumer, local available information of the NF service provider, and local available information of the proxy profile. In this example, the NRF discovers proxies based on NSSAI. Optionally the NRF may discover proxy instances based on the input parameters from a standalone discovery request explicitly for proxy.

At block 1104, the NRF sends out the discovered NF service provider instances and proxy instances. At block 1105, the NF service consumer may select a NF service provider instance. The NF service consumer may also select a proxy. Then, the NF service consumer may invoke service towards the target NF service provider via the proxy accordingly. At block 1106a and 1106b, the service request is routed via the selected proxy, which performs necessary proxy functions. Optionally, when an NF profile or a proxy profile is updated, the NRF may notify the NF consumer about the change(s), via Nnrf_NFManagement service, subscription/notification method, as defined in 3GPP TS 29.510. It should be noted that two blocks shown in succession in the figures may, in fact, be executed substantially concurrently, or the blocks may sometimes be executed in the reverse order, depending upon the functionality involved.

Figure 12:
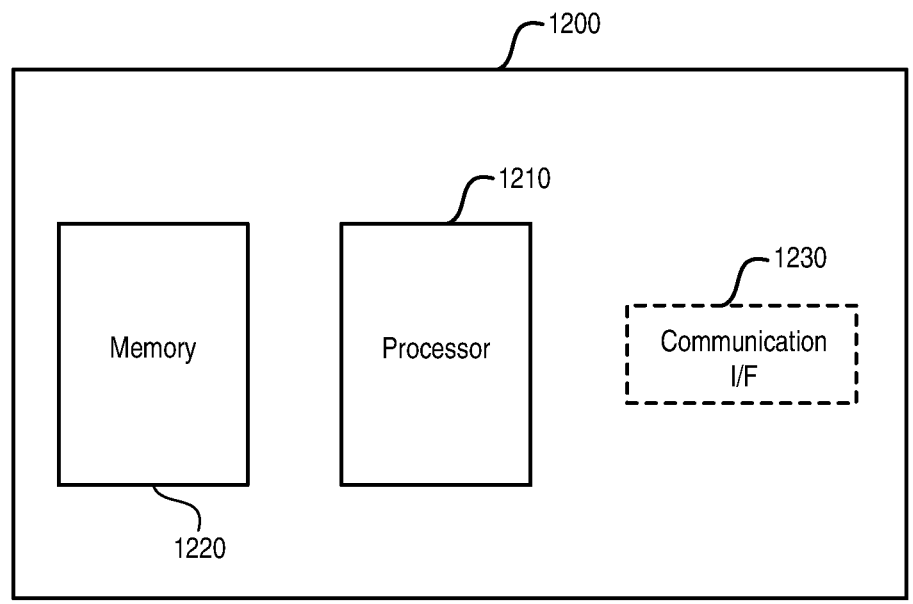
FIG. 12 is a block diagram showing an apparatus suitable for use in practicing some embodiments of the disclosure.

FIG. 12 is a block diagram showing an apparatus suitable for use in practicing some embodiments of the disclosure. For example, any one of the first network function, the second network function, the proxy and the network node described above may be implemented through the apparatus 1200. As shown, the apparatus 1200 may include a processor 1210, a memory 1220 that stores a program, and optionally a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

Figure 13:
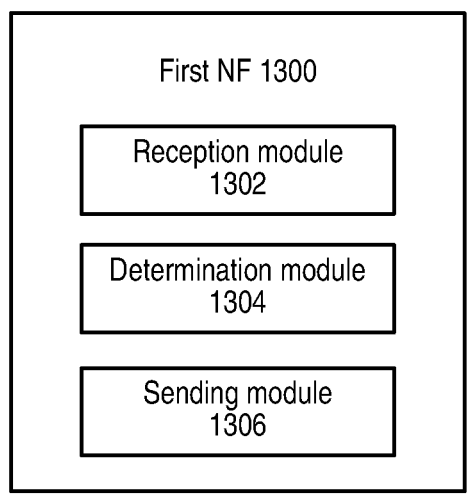
FIG. 13 is a block diagram showing a first network function according to an embodiment of the disclosure.

FIG. 13 is a block diagram showing a first network function according to an embodiment of the disclosure. As shown, the first network function 1300 comprises a reception module 1302, a determination module 1304 and a sending module 1306. The reception module 1302 may be configured to receive, from a second network function, a request for proxy discovery, as described above with respect to block 302. The determination module 1304 may be configured to determine at least one proxy for the second network function based on the request for proxy discovery and one or more proxy profiles available at the first network function, as described above with respect to block 304. The sending module 1306 may be configured to send first information about the at least one proxy to the second network function, as described above with respect to block 306.

Figure 14:
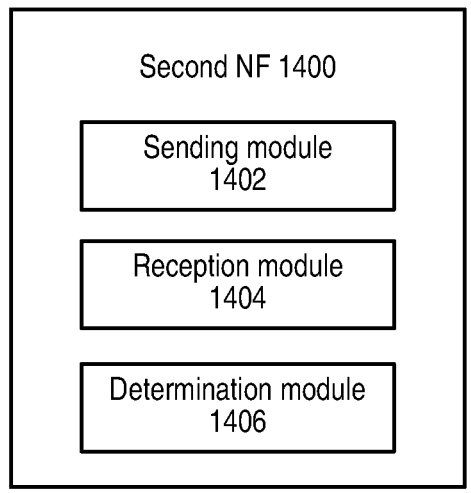
FIG. 14 is a block diagram showing a second network function according to an embodiment of the disclosure.

FIG. 14 is a block diagram showing a second network function according to an embodiment of the disclosure. As shown, the second network function 1400 comprises a sending module 1402, a reception module 1404 and a determination module 1406. The sending module 1402 may be configured to send, to a first network function, a request for proxy discovery, as described above with respect to block 502.

The reception module 1404 may be configured to receive, from the first network function, first information about at least one proxy, as described above with respect to block 504. The determination module 1406 may be configured to determine a proxy for routing traffic, based on the first information, as described above with respect to block 506.

Figure 15:
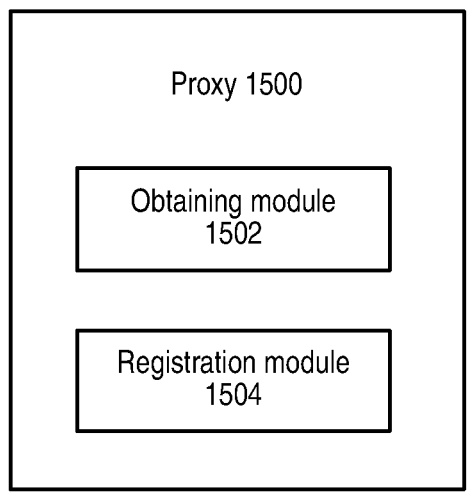
FIG. 15 is a block diagram showing a proxy according to an embodiment of the disclosure.

FIG. 15 is a block diagram showing a proxy according to an embodiment of the disclosure. As shown, the proxy 1500 comprises an obtaining module 1502 and a registration module 1504. The obtaining module 1502 may be configured to obtain a proxy profile of the proxy, as described above with respect to block 702. The registration module 1504 may be configured to register the proxy profile to a first network function, as described above with respect to block 704.

Figure 16:
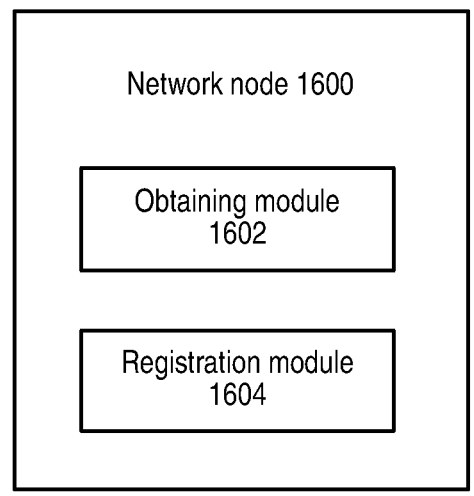
FIG. 16 is a block diagram showing a network node according to an embodiment of the disclosure.

FIG. 16 is a block diagram showing a network node according to an embodiment of the disclosure. As shown, the network node 1600 comprises an obtaining module 1602 and a registration module 1604. The obtaining module 1602 may be configured to obtain a proxy profile of a proxy associated with the network node, as described above with respect to block 802. The registration module 1604 may be configured to register the proxy profile to a first network function, as described above with respect to block 804. The modules described above may be implemented by hardware, or software, or a combination of both.

As used herein, the term UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a first network function, the method comprising:
   receiving, from a second network function, a request for proxy discovery, the request for proxy discovery being a request for network function discovery which is reused to additionally request for proxy discovery;
   determining at least one third network function for the second network function;
   determining at least one proxy located between the second network function and at least one third network function for the second network function based on the request for proxy discovery and one or more proxy profiles available at the first network function; and
   sending first information about the at least one proxy and second information about the at least one third network function together to the second network function.

2. The method according to claim 1, wherein each proxy profile of the one or more proxy profiles is from at least one of:
   local configuration of the first network function;
   registration from a proxy corresponding to the proxy profile;
   registration from a fourth network function associated with the proxy corresponding to the proxy profile; and
   registration from a third party node.

3. The method according to claim 2, wherein the association between the proxy and the fourth network function is indicated from one of: the local configuration; the proxy; the fourth network function; and the third party node.

4. The method according to claim 1, further comprising:
in response to a change of proxy profile of the at least one proxy, informing the second network function about the change of proxy profile.

5. The method according to claim 1, wherein the request for proxy discovery comprises third information for proxy selection; and
wherein a proxy whose proxy profile is matched with the third information is determined as one of the at least one proxy.

6. The method according to claim 1, wherein the request for network function discovery comprises fourth information for network function selection; and
wherein the second information is the same as or different than the fourth information.

7. The method according to claim 1, wherein the proxy profile of a proxy comprises at least one of: identification information, capability information, subscriber information, location information, and network information related to the proxy.

8. A method implemented at a second network function, the method comprising:
sending, to a first network function, a request for proxy discovery, the request for proxy discovery being a request for network function discovery which is reused to additionally request for proxy discovery;
receiving together, from the first network function, first information about at least one proxy and second information about at least one third network function; and
determining at least one proxy located between the second network function and the at least one third network function for routing traffic, based on the first information.

9. The method according to claim 8, further comprising:
receiving, from the first network function, information about a change of proxy profile of the at least one proxy.

10. The method according to claim 8, wherein the request for proxy discovery comprises third information for proxy selection.

11. The method according to claim 8, wherein the request for network function discovery comprises third information for network function selection; and
wherein the second information is the same as or different than the third information.

12. The method according to claim 8, further comprising:
determining a fourth network function for providing a service to the second network function, based on the second information; and
invoking the service towards the determined fourth network function via the determined proxy.

13. A first network function comprising:
at least one processor; and
at least one memory, the at least one memory containing instructions executable by the at least one processor, whereby the first network function is operative to:
receive, from a second network function, a request for proxy discovery, the request for proxy discovery being a request for network function discovery which is reused to additionally request for proxy discovery;
determine at least one third network function for the second network function;
determine at least one proxy located between the second network function and the at least one third network function for the second network function based on the request for proxy discovery and one or more proxy profiles available at the first network function; and
send first information about the at least one proxy and second information about the at least one third network function and together to the second network function.

14. The first network function according to claim 13, wherein each proxy profile of the one or more proxy profiles is from at least one of:
local configuration of the first network function;
registration from a proxy corresponding to the proxy profile;
registration from a fourth network function associated with the proxy corresponding to the proxy profile; and
registration from a third party node.

15. A second network function comprising:
at least one processor; and
at least one memory, the at least one memory containing instructions executable by the at least one processor, whereby the second network function is operative to:
send, to a first network function, a request for proxy discovery, the request for proxy discovery being a request for network function discovery which is reused to additionally request for proxy discovery;
receive together, from the first network function, first information about at least one proxy and second information about at least one third network function; and
determine at least one proxy located between the second network function and at least one third network function for routing traffic based on the first information.

16. The second network function according to claim 15, wherein the second network function is operative to receive, from the first network function, information about a change of proxy profile of the at least one proxy.

* * * * *